Figure 1:
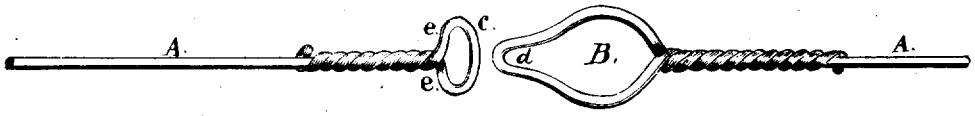

E. S. LENOX.

WIRE BALE FASTENING.

No. 7,026. Reissued April 4. 1876.

Witnesses.
W. B. Stanford
P. H. Ryan

Inventor.
Edwin S. Lenox
by Wm. Wm. Rodgers
Atty

UNITED STATES PATENT OFFICE.

EDWIN S. LENOX, OF NEW YORK, N. Y.

IMPROVEMENT IN WIRE BALE-FASTENINGS.

Specification forming part of Letters Patent No. 98,169, dated December 21, 1869; reissue No. 7,026, dated April 4, 1876; application filed February 3, 1876.

DIVISION A.

*To all whom it may concern:*

Be it known that I, EDWIN S. LENOX, of the city, county, and State of New York, formerly of New Brighton, said State, have invented certain new and useful Improvements in Wire Bale-Ties, of which the following is a full, clear, and complete description, reference being had to the drawing, in which—

Figure 2:
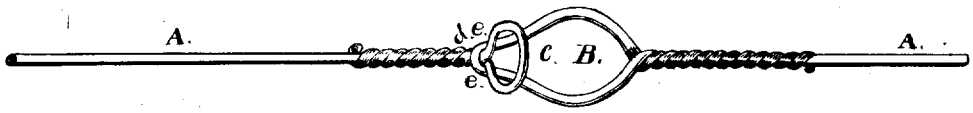

Figure 1 shows the two parts of the tie disconnected, and Fig. 2 shows the same two parts locked together.

In the drawing, A represents the bale-wire intended to be passed around the bale and have its ends secured by the tie. B represents one part of the tie, being a loop formed upon one end of the wire, which I designate as the "loop end." *e e c* designate a hook or catch which may be formed in the other end of the wire to catch into the loop and secure the ends together.

The invention relates solely to ties for bale-bands formed of flexible wire; and consists, principally, in forming that part of the wire which is intended to pass through the loop and catch into it of the doubled end of the bale-band wire itself, which is bent back and twisted, as shown in the drawing.

The invention has, however, other features which are pointed out in the claims, such as the bracing of the hook or catch upon the loop end of the wire, and also the bracing of that part of it which is opposed to the direct strain by a curved part of the hook, as at C.

By using the doubled end of the wire twisted upon itself, as shown in the drawing, the danger of cutting and of the slipping of the tie upon itself, which occurs with a single wire, is avoided, and by the use of a catch formed substantially as shown in the drawing I obviate the danger of its bending back, so as to release itself from the loop, which would occur if a hook of the common form were used.

It has been proposed to use a double hook of a larger piece of wire than the bale-band wire itself, but by the use of my invention I am enabled to form the band and tie of the same wire.

The method of constructing and using my tie is fully shown in the drawing, and is so simple that it does not need further description.

The particular features of this invention which I claim to be new, and desire to protect by Letters Patent, are pointed out below—that is to say, I claim—

1. A wire bale-band and tie of one piece of flexible wire, having the loop B at one end, and having the other end bent back and twisted upon itself, so that the doubled wire can be passed through the loop.

2. A wire bale-tie, consisting of a loop on one end of the bale-band and a double wire catch upon the other, of wire, of the same size as, or continuous with, the bale-band wire, substantially as shown and described.

3. A wire bale-tie in which the catch is bent forward, so as to brace and support itself upon the loop end of the wire, instead of merely curving back upon itself in ordinary hoop form.

4. A wire bale-tie in which the part of the catch which is directly opposed to the strain tending to separate the wires is supported or braced upon the loop end of the wire.

5. A wire bale-tie in which that end of the wire forming the catch *e e c* is bent or doubled upon itself, substantially as shown and described.

6. A wire bale-tie in which that part of the wire forming the catch or hook *e e c* is bent upon itself and curved, so as to support or brace itself, substantially as shown and described.

7. A wire bale band and tie, consisting of a single piece of flexible wire having a loop, B, at one end, and having the other end bent back and twisted upon itself when the doubled end of the wire is passed through the loop B.

EDWIN S. LENOX.

Witnesses:
W. B. GLASSFORD,
WYLLYS HODGES.